United States Patent [19]

Watanabe et al.

[11] Patent Number: 5,554,251
[45] Date of Patent: Sep. 10, 1996

[54] OPTICAL DEVICE ASSEMBLE APPARATUS

[75] Inventors: Noriko Watanabe, Nara; Hiroshi Nakanishi, Tenri; Kazuhiro Shibata, Kashihara; Hiroshi Hamada, Nara; Fumiaki Funada, Yamatokoriyama, all of Japan

[73] Assignee: Sharp Kabushiki Kaisha, Osaka, Japan

[21] Appl. No.: 282,419

[22] Filed: Jul. 29, 1994

Related U.S. Application Data

[63] Continuation of Ser. No. 862,626, Apr. 1, 1992, abandoned.

[30]  Foreign Application Priority Data

| Apr. 3, 1991 | [JP] | Japan | 3-071208 |
| Apr. 4, 1991 | [JP] | Japan | 3-071929 |
| Oct. 30, 1991 | [JP] | Japan | 3-285132 |

[51] Int. Cl.$^6$ ................................................. B32B 35/00
[52] U.S. Cl. ............. 156/379.8; 156/378; 156/379; 156/273.5; 156/275.5; 356/363; 356/374; 356/400
[58] Field of Search ............. 156/275.5, 275.7, 156/379.6, 379.8, 380.9, 378, 379, 64; 356/138, 354, 359, 363, 374, 399, 400

[56]  References Cited

U.S. PATENT DOCUMENTS

| 3,689,162 | 9/1972 | Ferguson | 356/374 |
| 4,134,651 | 1/1979 | England | 354/17 |
| 4,443,494 | 4/1984 | Gonser | 156/275.5 X |
| 4,771,180 | 9/1988 | Nomura et al. | 356/400 X |
| 5,050,111 | 9/1991 | Ayata et al. | 356/400 X |
| 5,054,929 | 10/1991 | Dey | 356/401 |
| 5,056,912 | 10/1991 | Hamada et al. | |
| 5,076,689 | 12/1991 | Adachi | 356/374 X |
| 5,144,462 | 9/1992 | Otsuka et al. | |
| 5,189,494 | 2/1993 | Muraki | 356/374 X |

FOREIGN PATENT DOCUMENTS

| 409618 | 1/1991 | European Pat. Off. |
| 59-078313 | 5/1984 | Japan |
| 60-165624 | 8/1985 | Japan |
| 60-165622 | 8/1985 | Japan |
| 60-165621 | 8/1985 | Japan |
| 60-165623 | 8/1985 | Japan |
| 1064319 | 3/1989 | Japan |

OTHER PUBLICATIONS

European Search Report.

*Primary Examiner*—David A. Simmons
*Assistant Examiner*—M. Curtis Mayes
*Attorney, Agent, or Firm*—Nixon & Vanderhye

[57]  ABSTRACT

A light source device emits light for positional alignment and light for adhesion toward the optical devices. A position detecting device receives the light for positional alignment from the optical devices and optically detects a positional displacement of the optical devices. A positional alignment mechanism moves the optical devices with respect to each other in accordance with a detecting result of the position detecting device, thereby positionally aligning the optical devices. After the optical devices are positionally aligned, the light for adhesion is radiated to a photo-curing adhesive resin interposed between the optical devices, thereby adhering the optical devices.

21 Claims, 12 Drawing Sheets

α > β

α > β

α = β

α = β

α : MICROLENS PITCH
β : PIXEL PITCH

OPTICAL DEVICE ASSEMBLE APPARATUS

This is a continuation of application Ser. No. 07/862,626, filed Apr. 1, 1992, now abandoned.

BACKGROUND OF THE INVENTION

1. Field of the Invention

The present invention relates to an optical device assemble apparatus for positionally aligning a set of optical devices including, for example, a matrix liquid crystal display device and a microlens array and for adhering the optical devices to each other with a photo-curing adhesive resin.

2. Description of the Prior Art

These days, a liquid crystal display device including two substrates and a liquid crystal enclosed therebetween is employed not only in a direct vision display apparatus, in which an image on the display device can be seen, but also in a projection display apparatus for projecting an image on a screen by transmitting a light through the display device. An example of the projection display apparatus is used for a projection TV.

When an enlargement ratio for projecting the image on the screen is improved in the projection display device, the number of pixels of the liquid crystal display device is required to be increased. Improving the enlargement ratio without increasing the number of the pixels results in an inferior quality image having lower precision.

However, an increase of the number of the pixels disproportionately enlarges a non-pixel area, which is not occupied by the pixels. Accordingly, the ratio of a black matrix covering the non-pixel area is heightened, and the ratio of an area of the pixels forming an image is lowered. This means that the ratio of openings of the liquid crystal display device is lowered. Such a phenomenon darkens a display plane of the liquid crystal display device, thus deteriorating the display quality. This problem is especially serious in an active matrix liquid crystal display device.

Japanese Laid-Open Patent Publication Nos. 60-165621 through 60-165624 disclose an apparatus for preventing such a deterioration of display quality caused by the reduction of the ratio of the openings. According to these patents, a liquid crystal display device has a microlens array on a surface thereof. Since the microlens array includes microlenses arranged in correspondence with the pixels of the liquid crystal display device, the light which would be blocked by the black matrix without the microlens array is converged in the pixels. As a result, the display plane is brightened, which improves the display quality.

Examples of this type of microlens include a semispherical microlens having a semispherical concave portion on a surface of a substrate thereof and a flat microlens having a refraction factor distributed inside a substrate thereof.

In such an apparatus, the microlens array is assembled with the liquid crystal display device. The applicant of the present invention has disclosed an example of such assembly in Japanese Laid-Open Patent Publication No. 1-187715. An ultraviolet ray-curing adhesive agent is painted all over a surface of one of the substrates, and microlenses are placed on the surface. Then, an ultraviolet ray is radiated to cure the adhesive agent, thus adhering the microlens array on the liquid crystal display device.

The ultraviolet ray-curing adhesive agent is desirable for the following reasons:

(1) A substrate having the liquid crystal display device thereon and a substrate having the microlens array are possibly formed of different materials. If a heat-curing resin is used as the adhesive agent, the two substrates are possibly positionally displaced or separated from each other by a difference in the coefficient of thermal expansion.

(2) A resin which is cured at room temperature takes longer to cure and has a smaller adhering strength than the photo-curing or the heat-curing resin.

The microlens array and the liquid crystal display device are required to be positionally aligned with high precision before being assembled. The positional alignment is conventionally done, for example, by a method used for positionally aligning two substrates of the liquid crystal display device. This method will be described with an example in which the two substrates of the liquid crystal display device are positionally aligned. An electrode pattern is formed on an inside surface of each substrate. A cell gap between the substrates is set to be several micron meters. The substrates are moved with respect to each other by a microscopic distance so that markers formed in advance on the substrates are included in an area of a depth of focus of the microscope.

After the positional alignment is finished, the substrates are temporarily adhered to each other at several peripheral portions with an instantaneous adhesive agent or by partially curing the ultraviolet ray-curing resin with light radiation. Then, the substrates having a liquid crystal therebetween are heated to cure a heat-curing resin for sealing the liquid crystal. As a result, the substrates are completely adhered.

The aforementioned markers are formed by emitting a light from a halogen lamp, and the ultraviolet ray is emitted from a light source other than the halogen lamp.

In the case that such a conventional method is used to paste the microlens array and the liquid crystal display device, there occurs the following problem. A marker which is formed on a surface having the microlens array is to be aligned with one of the markers of the liquid crystal display device. The markers to be aligned have a gap therebetween, which corresponds to a thickness of the substrate having the above one of the markers. Since an ordinary microscope cannot focus on both of the markers simultaneously, precise positional alignment cannot be done quickly.

SUMMARY OF THE INVENTION

The optical device assemble apparatus, for adhering a set of optical devices after the optical devices are positionally aligned, of this invention, which overcomes the above-discussed and numerous other disadvantages and deficiencies of the prior art, comprises a light source device for emitting light for positional alignment and light for adhesion toward the optical devices; a position detecting device for receiving the light for positional alignment from the optical devices and optically detecting a positional displacement of the optical devices; and a positional alignment mechanism for supporting the optical devices to be movable with respect to each other and positionally aligning the optical devices in accordance with a detecting result of the position detecting device. The light for adhesion is radiated to a photo-curing adhesive resin interposed between the optical devices which are positionally aligned to adhere the optical devices.

In a preferred embodiment of the invention, the set of optical devices includes a microlens array and a matrix liquid crystal display device. The light source device comprises a first light source for emitting the light for positional alignment and a second light source for emitting the light for adhesion. The light emitted by the first light source is directed to be incident on the optical devices from the side of the microlens array. The position detecting device receives a portion of the light for positional alignment emitted by the first light source, the portion having been transmitted through the optical devices.

In a preferred embodiment of the invention, the set of optical devices includes a microlens array and a matrix liquid crystal display device. The light source device comprises a light source for emitting both the light for positional alignment and the light for adhesion and a shutter for cutting off the light for adhesion at a closed state. The light for positional alignment is directed to be incident on the optical devices from the side of the microlens array through the shutter. The position detecting device receives a portion of the light for positional alignment emitted by the light source, the portion having been transmitted through the optical devices.

In a preferred embodiment of the invention, the light for positional alignment is a parallel light. The position detecting device comprises a projecting device for projecting a display plane of the matrix liquid crystal display device in an enlarged state.

In a preferred embodiment of the invention, the light for positional alignment is a parallel light. The position detecting device comprises monitoring means for monitoring a converging spot of microlenses of the microlens array in an enlarged state.

In a preferred embodiment of the invention, the set of optical devices includes a microlens array and a matrix liquid crystal display device. The light source device includes a first light source for emitting the light for positional alignment and a second light source for emitting the light for adhesion. The light emitted by the first light source is directed to be incident on the optical devices from the side of the microlens array. The position detecting device receives a portion of the light for positional alignment emitted by the first light source, the portion having been reflected by the optical devices.

In a preferred embodiment of the invention, the set of optical devices includes a microlens array and a matrix liquid crystal display device. The light source device includes a light source for emitting both the light for positional alignment and the light for adhesion and a shutter for cutting off the light for adhesion at a closed state. The light for positional alignment is directed to be incident on the optical devices from the side of the microlens array through the shutter. The position detecting device receives a portion of the light for positional alignment emitted by the light source, the portion having been reflected by the optical devices.

In a preferred embodiment of the invention, the set of optical devices includes a microlens array and a matrix liquid crystal display device. The light source device includes a first light source for emitting the light for positional alignment and a second light source for emitting the light for lamination. The light emitted by the first light source is directed to be incident on the optical devices from the side of the matrix liquid crystal display device. The position detecting device receives a portion of the light for positional alignment emitted by the first light source, the portion having been transmitted through the optical devices.

In a preferred embodiment of the invention, the set of optical devices includes a microlens array and a matrix liquid crystal display device. The light source device includes a light source for emitting both the light for positional alignment and the light for adhesion and a shutter for cutting off the light for adhesion when at a closed state. The light for positional alignment is directed to be incident on the optical devices from the side of the matrix liquid crystal display device. The position detecting device receives a portion of the light for positional alignment emitted by the light source, the portion having been transmitted through the optical devices.

In a preferred embodiment of the invention, the light for adhesion is emitted toward to the optical devices when the shutter is open.

In a preferred embodiment of the invention, the light source device is operated in association with a state of the shutter and further comprises an aperture device for, in a closed state, allowing the light for positional alignment emitted by the light source device to be in a state of light emitted by a point light source.

In a preferred embodiment of the invention, the position detecting device monitors moiré fringes formed by the light for positional alignment reflected by a black matrix of the matrix liquid crystal display device and transmitted through microlenses of the microlens array.

In a preferred embodiment of the invention, the position detecting device monitors moiré fringes formed by the light for positional alignment transmitted though an opening of a black matrix of the matrix liquid crystal display device and microlenses of the microlens array.

In a preferred embodiment of the invention, the position detecting device comprises switching device for switching conditions of the light for positional alignment incident on the optical devices and adjusts a state of the moiré fringes in accordance with the conditions of the light.

In a preferred embodiment of the invention, the switching device comprises a lens movable on a path of the light for positional alignment along the path of the light.

In a preferred embodiment of the invention, the switching device comprises a lens movable between a position on a path of the light for positional alignment and a position off the path.

In a preferred embodiment of the invention, the switching device comprises a diffusing plate movable on a path of the light for positional alignment along the path of the light.

In a preferred embodiment of the invention, the switching devices comprises a diffusing plate movable between a position on a path of the light for positional alignment and a position off the path.

In a preferred embodiment of the invention, the diffusing plate comprises a microlens array.

Thus, the invention described herein makes possible the objective of providing an optical device assemble device for positionally aligning and adhering optical devices easily and precisely with a simple construction.

BRIEF DESCRIPTION OF THE DRAWINGS

This invention may be better understood and its numerous objects and advantages will become apparent to those skilled in art by reference to the accompanying drawings as follows.

DESCRIPTION OF THE PREFERRED EMBODIMENTS

The present invention will be described by way of illustrating embodiments with reference to the accompanying drawings.

Example 1

Figure 1:
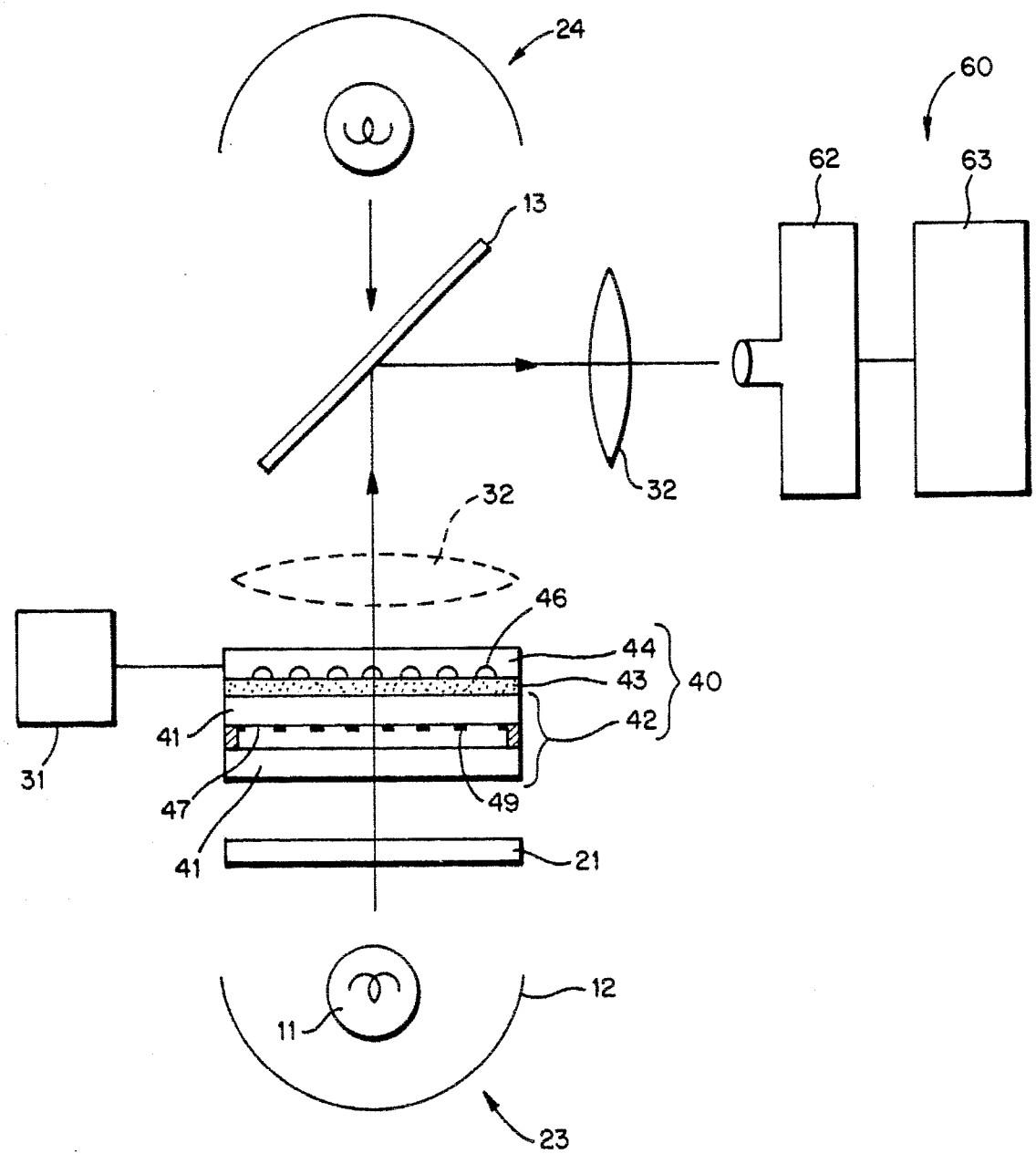
FIG. 1 is a schematic view of an optical device assemble apparatus according to a first example of the present invention.

FIG. 1 illustrates an optical device assemble apparatus according to a first example of the present invention.

A work piece 40 includes a matrix liquid crystal display device (hereinafter, referred to as the "LCD device") 42, and a microlens array 44, which are opposed to each other. The LCD device 42 has a pair of substrates 41 and a black matrix 49 interposed therebetween, and the black matrix 49 has openings 47. The LCD device 42 and the microlens array 44 are to be assembled. A pitch between the microlenses 46 and a pitch between pixels of the LCD device 42 are equal to each other. A photo-curing adhesive resin 43 is pasted between the LCD device 42 and the microlens array 44. The LCD device 42 and the microlens array 44 are movable with respect to each other while keeping the photo-curing adhesive resin 43 therebetween.

In FIG. 1, a light source 23 for light for positional alignment is disposed on the side of the LCD device 42, and a light source 24 for light for adhesion is disposed on the side of the microlens array 44.

The light emitted from the light source 23 is directed toward the work piece 40 through a shortwave cutting filter 21. The light transmitted through the work piece 40 is incident on an alignment detecting device 60 through a reflective mirror 13. The alignment detecting device 60 is provided for monitoring moiré fringes generated by the light transmitted through the openings 47 and the microlenses 46. The positional alignment of the LCD device 42 and the microlens array 44 is conducted by monitoring the moiré fringes as will be described later.

After the positional alignment is completed, the reflective mirror 13 is removed, and the light for adhesion is radiated from the light source 24 to the work piece 40, thereby curing the photo-curing adhesive resin 43 to adhere the LCD device 42 and the microlens array 44. Employed as the photo-curing adhesive resin 43 in the first example is an ultraviolet ray-curing adhesive agent, practically, NOA-61 produced by Norlane Corporation.

The optical device assemble apparatus according to the construction of FIG. 1 will be described in detail, hereinafter.

The light source 23 includes a lamp 11 and a concaved mirror 12. The light from the lamp 11 is converged to the concaved mirror 12 and is led to the shortwave cutting filter 21. Employed as the lamp 11 is, for example, a mercury lamp, which emits light having both a component belonging to a short wavelength range (hereinafter, referred to as the "shortwave component") and a component belonging to a long wavelength range (hereinafter, referred to as the "longwave component"). The shortwave cutting filter 21 blocks the shortwave component, to which the photo-curing adhesive resin 43 is sensitive. Therefore, the lamp 11 may emit light including the shortwave and longwave components. The longwave component is used for positional alignment.

The light transmitted through the shortwave cutting filter 21 is led to the work piece 40. After transmitting through the openings 47 and the microlenses 46, the light is reflected by the reflective mirror 13 to be incident on the alignment detecting device 60. The alignment detecting device 60 includes a CCD camera 62, and a monitoring TV 63 for visualizing a signal from the CCD camera 62. As mentioned before, the light transmitted through the openings 47 and the microlenses 46 forms the moiré fringes.

Figure 2:
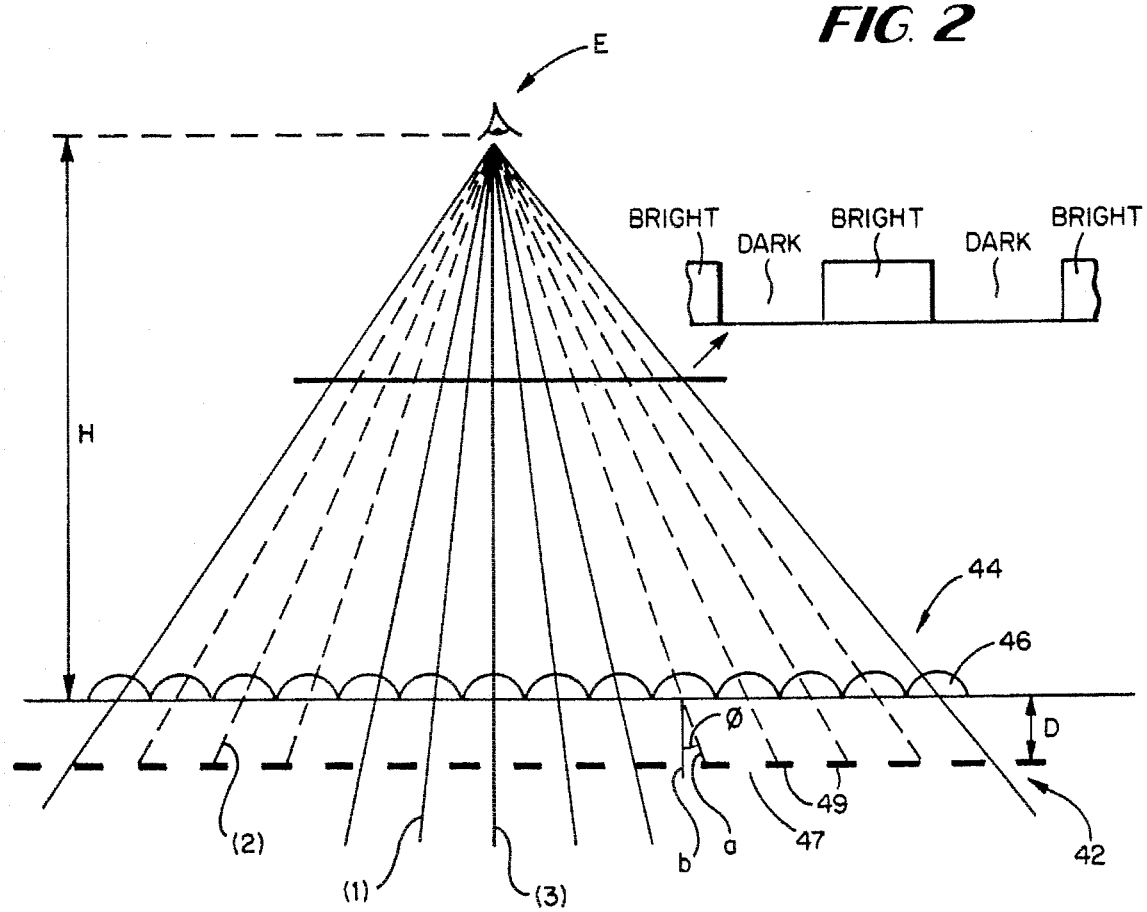
FIG. 2 is a view illustrating a principle of generating moiré fringes.

FIG. 2 illustrates a principle of generating moiré fringes. When the LCD device 42 superposed by the microlens array 44 is looked down from a position E having a height of H, the line of sight is incident on the microlenses 46 with different angles of incidence $\phi$ depending on the pixels of the LCD devices 42. The microlenses 46 and the pixels have a certain distance D therebetween due to the substrate 41 (formed of a glass) and other members. The focal distance of the microlenses 46 is matched to the distance D. When an observer intends to look at a point of one of the pixels from the position E, the line of sight is incident on a center of the microlens 46 above the point by an angle of incidence $\phi$. When the line of sight reaches the LCD device 42, the intersection "a" is at a distance of D×tan$\phi$ from the point "b" perpendicularly below the center of the microlens 46. The observer looks at the intersection "a" in actuality.

Figure 3:
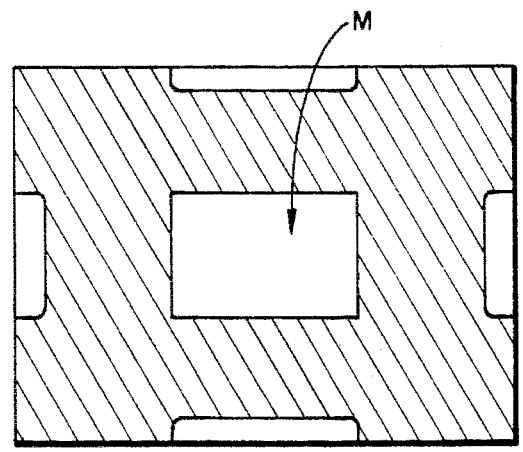
FIG. 3 is a view showing the moiré fringes generated when a liquid crystal display device and a microlens array of a work piece are positionally aligned.

In the case that the line of sight goes through the opening 47 as is indicated by (1) of FIG. 2, the observer picks up a bright portion owing to the light transmitted through the work piece 40 from the light source 23. In the case that the line of sight is on the black matrix 49 as is indicated by (2), the observer picks up a dark portion because the light from the light source 23 is blocked. In this way, the moiré fringes are generated as is shown in FIG. 3. The moiré fringes enable the observer to see the opening 47 of the pixel, which are too microscopic to see with the human eye. The moiré fringes are monitored by the alignment detecting device 60 in an enlarged state.

The positional alignment in the first example of FIG. 1 utilizes the principle that the shape of the moiré fringes greatly changes in accordance with the degree of displacement of the pixels of LCD device 42 and the microlenses 46.

For example, in the case when the openings 47 and the microlenses 46 are located at regular positions thereof, namely, the LCD device 42 and the microlens array 44 are positionally aligned, the light transmitted through the work piece 40 is shown as a bright portion M in FIG. 3 at a center of a display plane of the monitoring TV 63. The bright portion M has an enlarged shape of the opening 47. In this state, the bright portion M has a largest possible area. (Namely, the converging spot of the microlens 46 is at the center of the opening 47 as is indicated by (3) of FIG. 2.)

Figure 4:
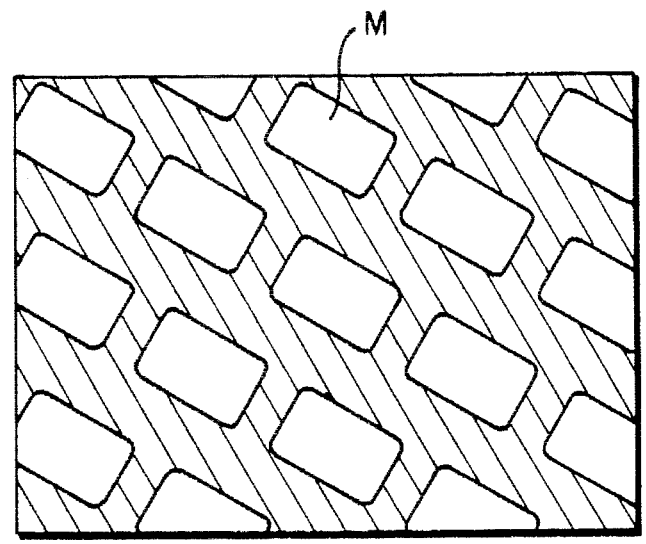
FIG. 4 is a view illustrating the moiré fringes generated when the liquid crystal display device and the microlens array are displaced from each other at a certain angle.

In the case that the microlens array 44 is displaced at a microscopic angle with respect to the array of the pixels of the LCD device 42, a lot of small openings are displayed in an inclined state on the monitoring TV 63 as is shown in FIG. 4.

Accordingly, by moving one of the LCD device 42 and the microlens array 44 with respect to each other so as to maximize the area of the bright portion M, the microlens array 44 and the LCD device 42 are positionally aligned. When the size of the bright portion M equals a specified one, it is judged that the positional alignment is completed, and the adhesion is conducted as mentioned above.

By inserting a field lens 32 between the reflective mirror 13 and the CCD camera 62 or between the reflective mirror 13 and the microlens array 44 as is shown in FIG. 1, the pitch between the bright portions can be varied in accordance with the focal distance of the field lens 32.

Figure 5:
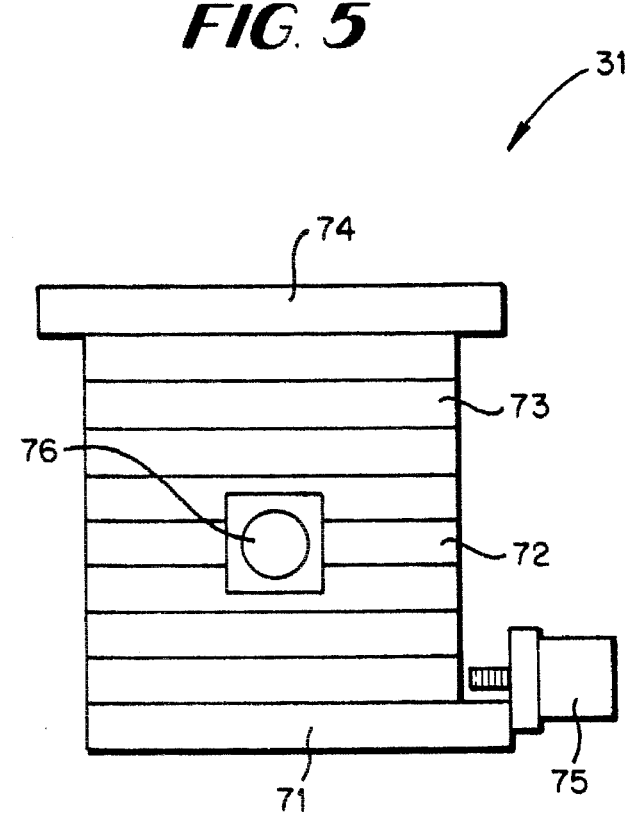
FIG. 5 is a front view of an aligning mechanism.

The positional alignment is practically conducted by operating an aligning mechanism 31 for moving the LCD device 42 or the microlens array 44 in X, Y and θ directions on a horizontal plane. As is shown in FIG. 5, the aligning mechanism 31 includes moving pieces 71 and 72, a rotating piece 73, and a fixing table 74. For example, the LCD device 42 is moved along an X axis by the moving piece 71, is moved along a Y axis by the moving piece 72, and is rotated at an angle of θ around a Z axis perpendicular to the X and Y axes by the rotating piece 73. In this case, the fixing table 74 fixes the microlens array 44 and supports the LCD device 42. The microlens array 44 may be moved in the above way by the moving pieces 71 and 72 and the rotating piece 73. In such a case, the fixing table 74 fixes the LCD device 42 and supports the microlens array 44. The moving pieces 71 and 72, and the rotating piece 73 are moved in the abovementioned way by a motor 75.

After the positional alignment is finished, the LCD device 42 and the microlens array 44 are adhered by radiating the light for adhesion.

According to the construction of FIG. 1, the positional alignment can be conducted quickly and precisely with a simple construction.

Although the light source 24 is disposed on the side of the microlens array 44 in FIG. 1, the light source 24 for adhesion may be disposed on the side of the LCD device 42.

Figure 6:
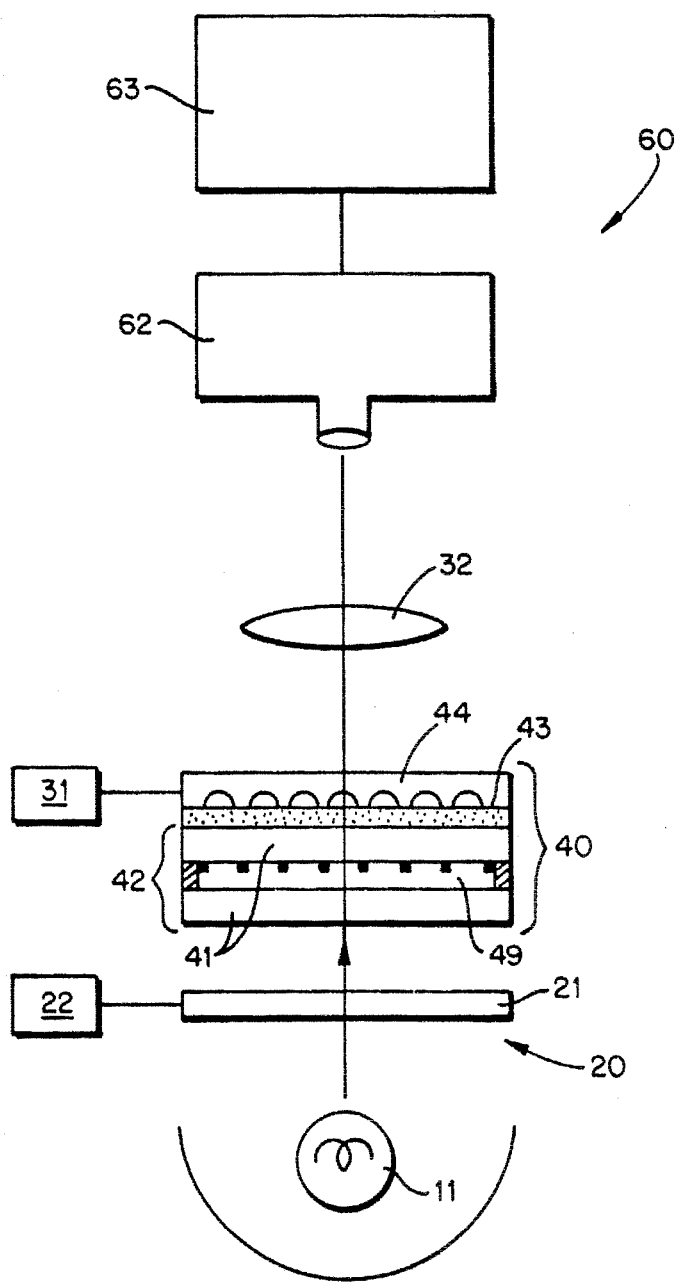
FIG. 6 is a schematic view of a modified construction of the first example.

The light used both for positional alignment and adhesion may both be emitted from the lamp 11 using an optical shutter 20 as is shown in FIG. 6. Since the moiré fringes are generated by the light transmitted through the LCD device 42 and then through the microlens array 44, the lamp 11 for emitting the light both for positional alignment and adhesion should be disposed on the side of the LCD device 42 and the alignment detecting device 60 should be disposed on the side of the microlens array 44. In FIG. 6, the identical members with those of FIG. 1 bear the identical reference numerals.

Figure 7:
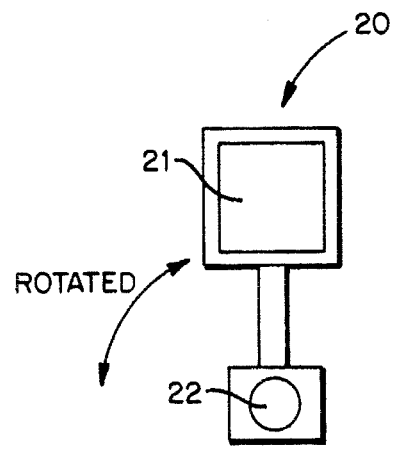
FIG. 7 is a front view of an optical shutter.

The optical shutter 20 includes the shortwave cutting filter 21 and a motor 22. As is shown in FIG. 7, the optical shutter 20 is closed when the shortwave cutting filter 21 is rotated to a specified position by the motor 22. In this state, the shortwave cutting filter 21 blocks the shortwave component of the light emitted from the lamp 11 and allows only the longwave component to pass. The optical shutter 20 is opened when the shortwave cutting filter 21 is rotated to another position. In this state, the light including the shortwave and longwave components is allowed to pass. The optical shutter 20 is closed for positional alignment and is opened for adhesion.

According to the construction of FIG. 6, positional alignment and adhesion can be performed by one light source (lamp 11). Therefore, the optical device assemble apparatus can be compact and can be produced at a low cost.

Example 2

Figure 8:
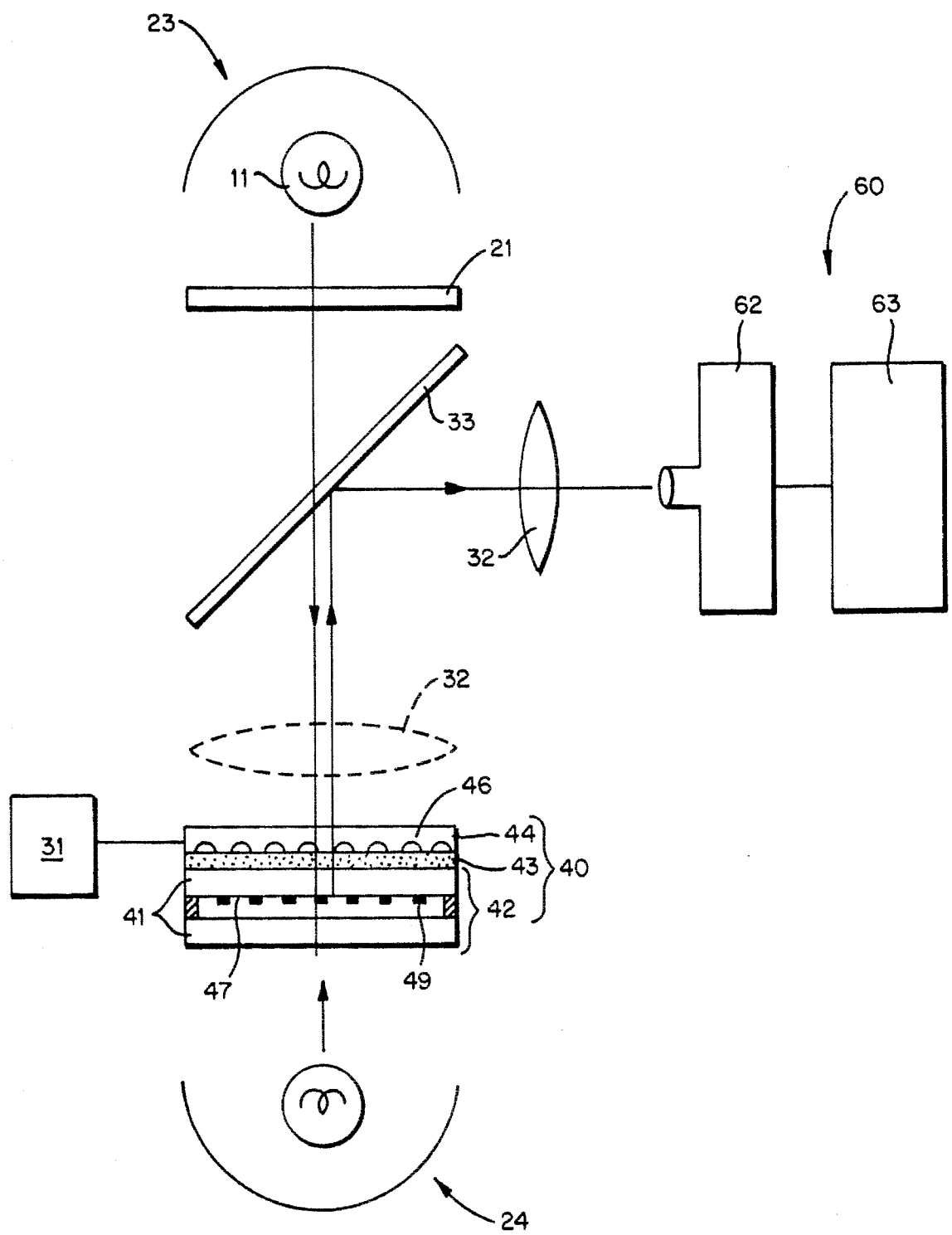
FIG. 8 is a schematic view of an optical device assemble apparatus according to a second example of the present invention.

FIG. 8 illustrates an optical device assemble apparatus according to a second example of the present invention.

In FIG. 8, the light source 23 for light for positional alignment and the alignment detecting device 60 are disposed on the side of the microlens array 44, and the light source 24 for light for adhesion is disposed on the side of the LCD device 42. Moiré fringes generated by the light reflected by the work piece 40 are monitored by the alignment detecting device 60. The shortwave cutting filter 21 is disposed on the side of the microlens array 44, and a half mirror 33 is provided instead of the reflective mirror 13. Except for these points, the construction of FIG. 8 is identical with the construction of FIG. 1. The work piece 40 has the identical construction with that of the construction of FIG. 1. The identical members with those of the construction of FIG. 1 bear the identical reference numerals.

The optical device assemble apparatus according to the construction of FIG. 8 will be described in detail.

The light emitted from the lamp 11 of the light source 23 is directed toward the work piece 40 through the shortwave cutting filter 21 and the half mirror 33.

The light incident on the work piece 40 is transmitted through the microlenses 46, is reflected by the black matrix 49, and then is transmitted through the microlens 46. In this way, the moiré fringes are generated. The light reflected by the work piece 40 is partially reflected to the right in FIG. 8 by the half mirror 33 and is incident on the CCD camera 62 through the field lens 32. Thus, the moiré fringes are picked up by the CCD camera 62 and are displayed on the monitoring TV 63 in an enlarged state. The positional alignment is conducted by monitoring the moiré fringes displayed on the monitoring TV 63.

The positional alignment is practically done by operating the alignment mechanism 31 described in the first example.

After the positional alignment is completed, the light is emitted from the light source 24 toward the work piece 40. Since such light is blocked by the black matrix 49, it is required to increase the amount of the light and to diffuse the light in order expand the light to a portion of the photocuring adhesive resin 43 shadowed by the black matrix 49. In this way, the photo-curing adhesive resin 43 is wholly cured. As the photo-curing adhesive resin 43, the ultraviolet ray-curing adhesive agent, practically, NOA-61 produced by Norland Corporation is used.

By inserting the field lens 32 between the half mirror 33 and the CCD camera 62 or between the half mirror 33 and the work piece 40, the pitch between the bright portions of the moiré fringes is varied in accordance with the focal distance of the field lens 32. By selecting a desirable pitch, the positional alignment can more easily be done. The construction of FIG. 8 has the same effects as those of the first example.

Figure 9:
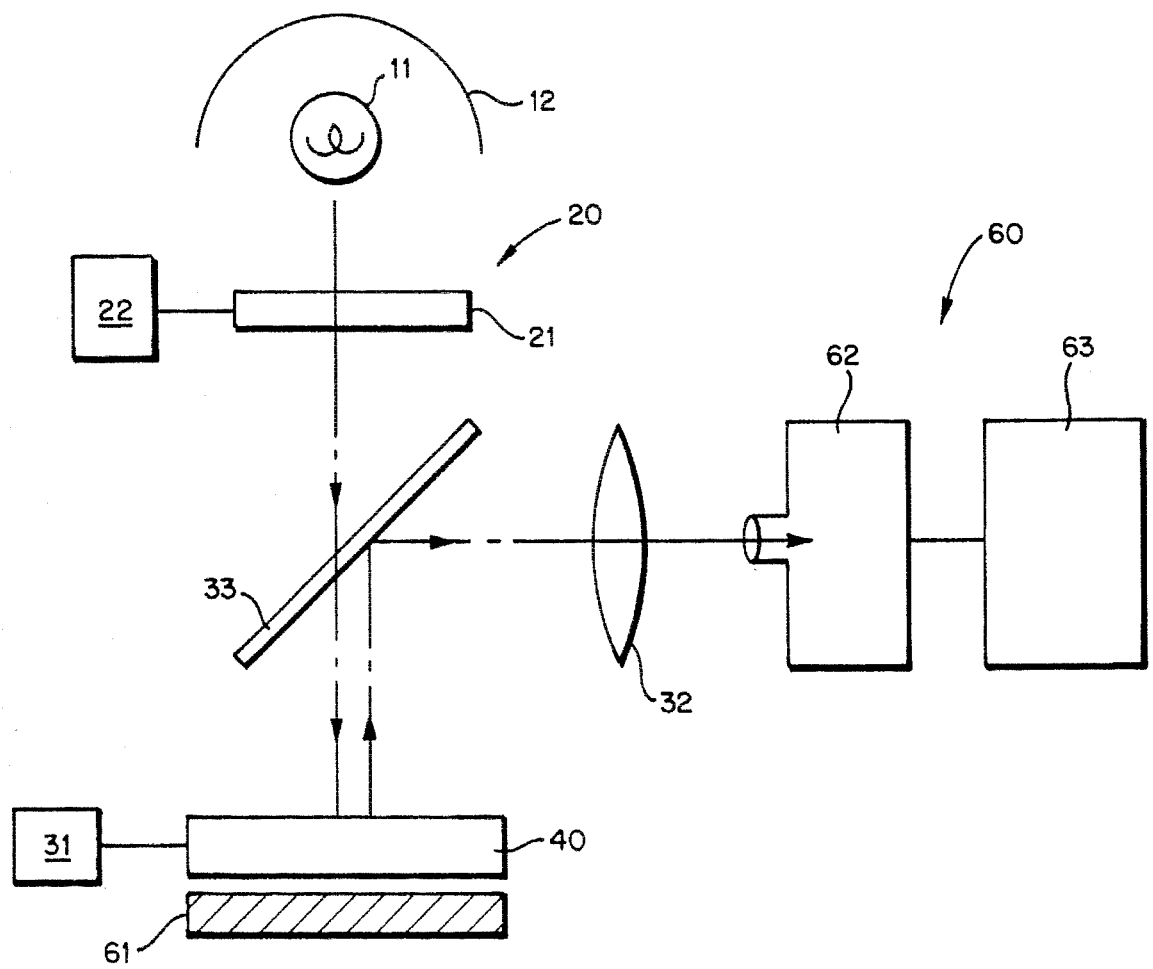
FIG. 9 is a schematic view of a modified construction of the second example

The light source 24 for the light for adhesion may be disposed on the side of the microlens array 44. In such a case, the light used both for positional alignment and adhesion may both be emitted from the lamp 11 the optical shutter 20 equipped with the shortwave cutting filter 21 as is shown in FIG. 9. (In FIG. 9, the identical members with those of FIG. 8 bear the identical reference numerals.)

Providing a light absorber 61 on the side of the LCD device 42 is desirable for the following reason: When an observer looks at the display plane of the monitoring TV 63 perpendicularly after the positional alignment is completed, an opening 47 can be seen at the center of the display plane as a bright opening. However, a peripheral portion of the opening 47 is bright since the light is reflected by the black matrix 49. Accordingly, the contrast between the opening 47 and the peripheral portion of the opening 47 is lowered, and moiré fringes are hard to watch. The light absorber 61 solves such inconvenience and clarifies the display plane. As a result, more accurate positional alignment is realized.

Example 3

Figure 10:
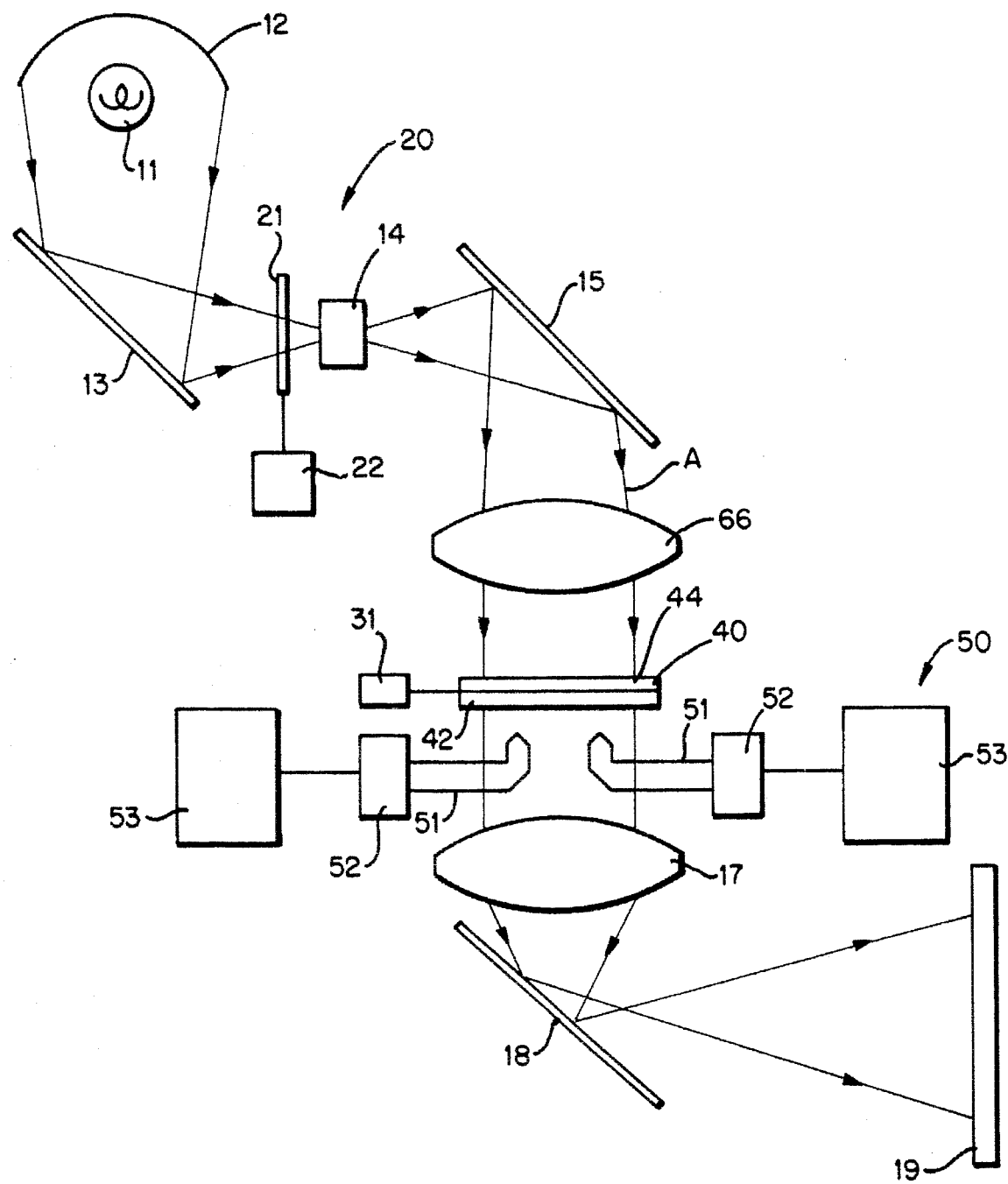
FIG. 10 is a schematic view of an optical device assemble apparatus according to a third example of the present invention.

FIG. 10 illustrates an optical device assemble apparatus according to a third example of the present invention.

The lamp 11 for emitting light used both for positional alignment and adhesion is disposed on the side of the microlens array 44. A screen 19 is disposed on the side of the LCD device 42. The work piece 40 has the identical construction with that of the first example.

The concaved mirror 12 is disposed in the vicinity of the lamp 11. The light emitted from the lamp 11 is converged by the concaved mirror 12 and directed toward the optical shutter 20 through the reflective mirror 13. Since the optical shutter 20 blocks the shortwave component for curing the photo-curing adhesive resin 43, the light transmitted through the optical shutter 20 is usable only for positional alignment. Then, the light is focused by an integrator 14, is reflected by a reflective mirror 15, and is transmitted through a field lens 66. The field lens 66 is provided for varying a state of the light from a converged state to a diffused state. After transmitting through the field lens 66, the light is directed to the work piece 40. The light transmitted through the microlenses 46 and the openings 47 generates moiré fringes, which are projected on the screen 19 through the projecting lens 17 and a reflective mirror 18. The positional alignment is conducted by monitoring the moiré fringes on the screen 19.

The field lens 66 is movable along the path of the light A incident on the field lens 66. By moving the field lens 66 by a known mechanism (not shown), the incident light is adjusted from the converged state to the diffused state including the parallel state.

The moiré fringes are adjusted to a desirable size by adjusting the state of the light incident on the work piece 40 from the converged state to the diffused state. For instance, in the case when the pitch between the openings 47 and the pitch between the microlenses 46 are not matched, the light is adjusted to run in parallel. In the case the above pitches are matched, the light is converged.

Figure 11A:
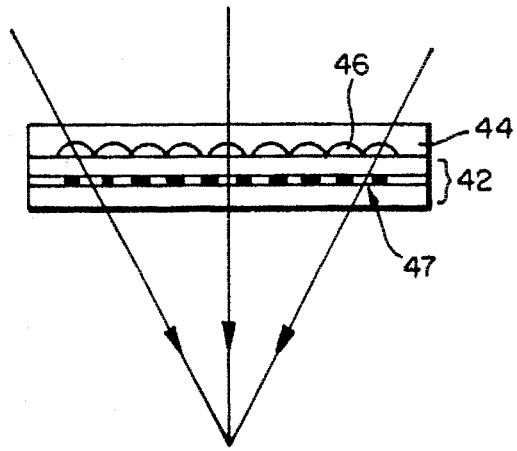
FIGS. 11a through 11d illustrate the relationship between light incident on the work piece and an arrangement of the liquid crystal display device and the microlens array.
Figure 11B:
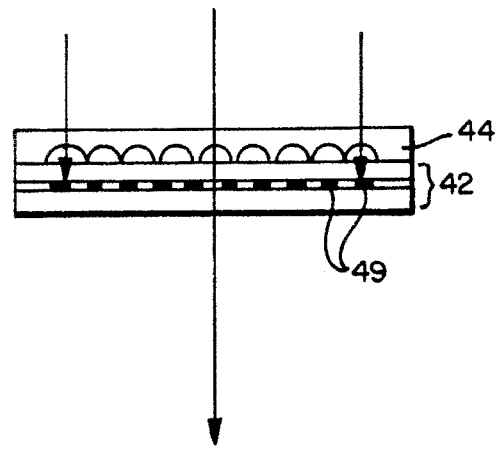
Figure 11C:
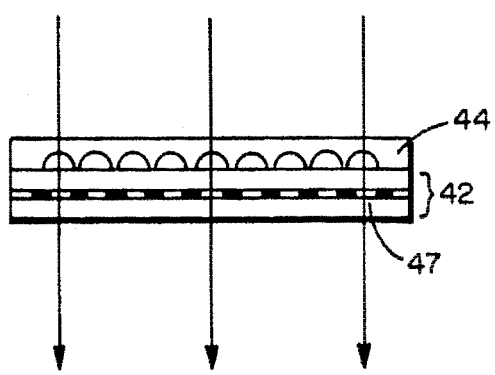
Figure 11D:
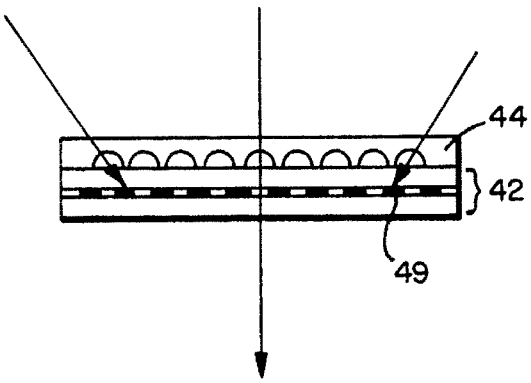

In the former case, a converged light is undesirably transmitted through the microlenses 46 and the openings 47 (FIG. 11a), but a parallel light is partially reflected by the black matrix 49 (FIG. 11b), thereby generating the moiré fringes. In the latter case, a parallel light is undesirably transmitted through the microlenses 46 and the openings 47 (FIG. 11c), but a converged light is partially reflected by the black matrix 49 (FIG. 11d), thereby generating the moiré fringes.

In the case that the moiré fringes are displaced from a specified position on the screen 19, that fact means the LCD device 42 and the microlens array 44 are not positionally aligned. The specified position is determined in advance by the use of a sample work piece produced by accurately aligning an LCD device and a microlens array. The specified position may be obtained by calculation. The positional alignment is done by operating the aligning mechanism 31 to locate the moiré fringes at the specified position.

Instead of the field lens 66, a collimator lens may be used. In such case, a converging lens or a diverging lens is inserted on the path of light A on an incident side or an outgoing side of the collimator lens.

After the positional alignment is completed, the shutter 20 is opened to allow the light including the shortwave and longwave components to pass. Thus, the light including the shortwave component is radiated to the photo-curing adhesive resin 43, thereby adhering the LCD device 42 and the microlens array 44. As the photo-curing adhesive resin 43, the ultraviolet ray-curing adhesive agent, practically, NOA-61 produced by Norland Corporation is used.

According to the construction of FIG. 10, positional alignment and adhesion can be performed by one light source (lamp 11). Therefore, the optical device assemble apparatus can be compact and can be produced at a low cost.

Instead of projecting the moiré fringes on the screen 19, the positional alignment may be conducted by the use of an alignment detecting device 50. As is shown in FIG. 10, the alignment detecting device 50 includes a pair of objective lens 51 for converging the light transmitted through the work piece 40, a pair of CCD cameras 52, and a pair of monitoring TVs 53 respectively connected to the CCD cameras 52. Each monitoring TV 53 is provided for processing a signal from the respective CCD camera 52 in a specified way to display a converging spot of the microlens 46 in an enlarged state. The positional alignment is conducted by adjusting the converging spot to locate the center of the opening 47.

It is necessary to avoid the relative rotation of the microlens array 44 and the LCD device 42 at an angle of θ° on a plane which is perpendicular to the optical axis of the objective lens 51. For this purpose, the objective lenses 51 and the CCD cameras 52 may be provided in a plurality, or an objective lens 51 and a CCD camera 52 may be moved integratedly along the X and the Y axes to monitor four corners of the work piece 40.

The positional alignment by the use of the alignment detecting device 50 has the same effects as the positional alignment by the use of the screen 19. The use of both of the screen 19 and the alignment detecting device 50 results in more accurate positional alignment.

Figure 12:
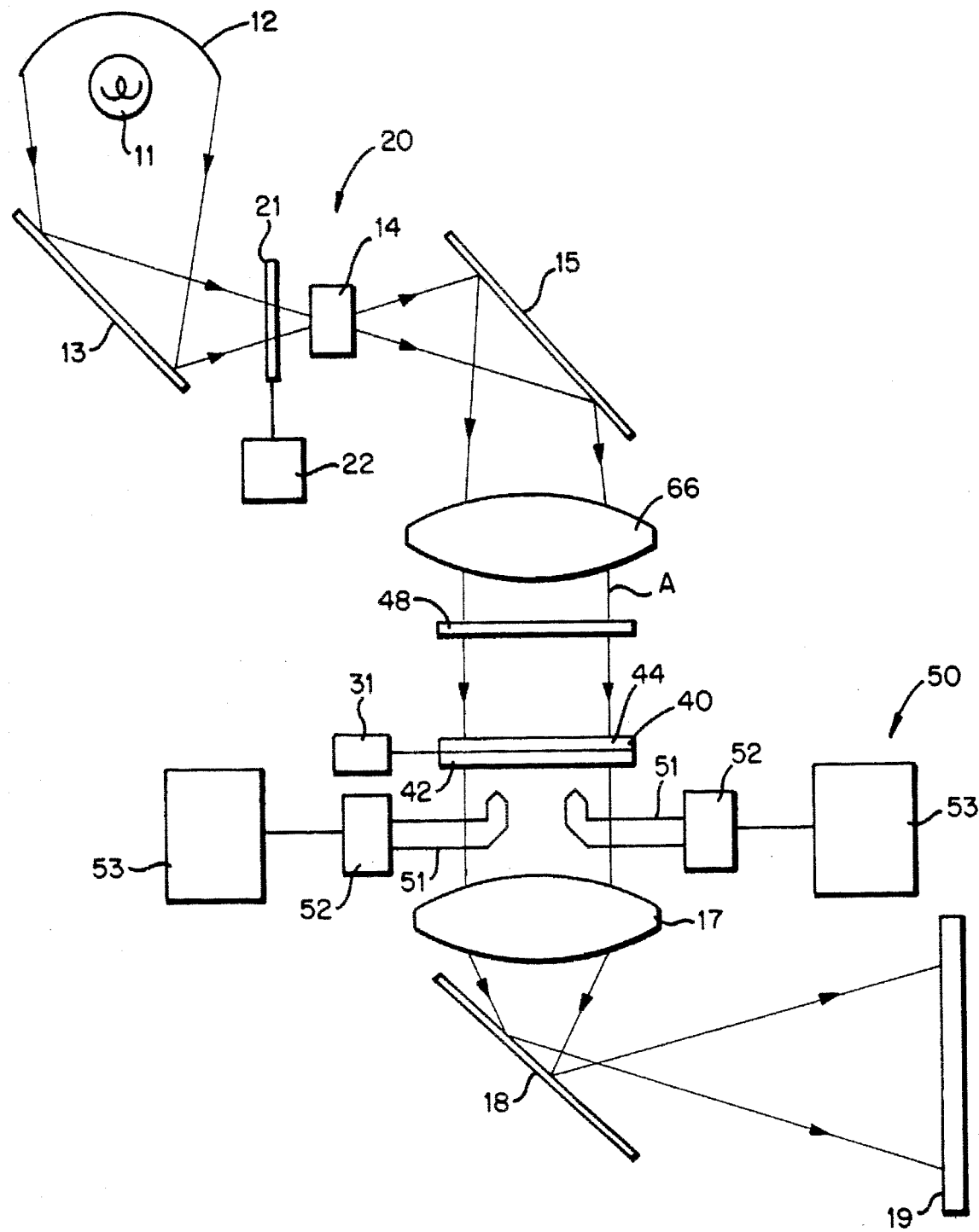
FIG. 12 is a schematic view of a modified construction of the third example.

As is shown in FIG. 12, a diffusing plate 48 may be provided between the field lens 66 and the work piece 40 on the path of light A. The diffusing plate 24 is inserted in a direction crossing the path of light A by a mechanism (not shown). In FIG. 12, the identical members with those in FIG. 10 bear the identical reference numerals.

The diffusing plate 48 is provided for diffusing the light from the field lens 66 before being incident on the work piece 40, whereby the moiré fringes disappear from the screen 19.

The field lens 66 is fixed at a position where the moiré fringes are generated. The positional alignment is conducted by controlling the generation of the moiré fringes by inserting the diffusing plate 48. Owing to the diffusing plate 48, the moiré fringes disappear from the screen 19. Accordingly, foreign objects accidentally put between the LCD device 42 and the microlens array 44 can be detected, thus realizing more accurate positional alignment.

As the diffusing plate 48, a frosted glass is generally used. In addition, a glass plate referred to as the "lemon skin" having an irregular concave and convex pattern on a surface thereof or a microlens array is used. Compared with the frosted glass, the "lemon skin" and the microlens array advantageously brightens the display plane of the screen 19 for inspection.

Figure 13:
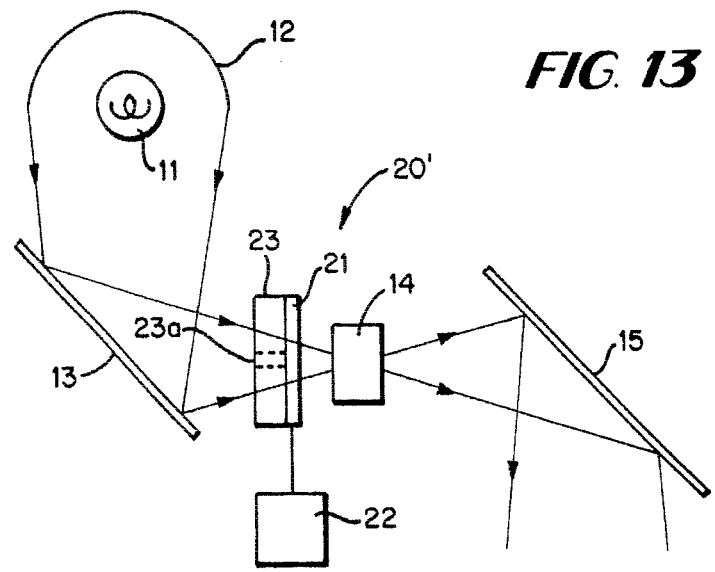
FIG. 13 is a schematic view of a construction equipped with another shutter.
Figure 14:
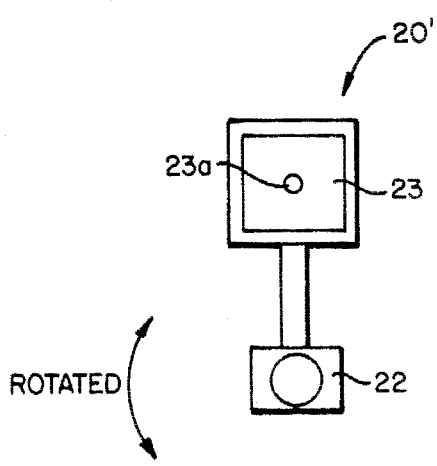
FIG. 14 is a front view of the shutter in FIG. 13.

Instead of the optical shutter 20, a shutter 20' shown in FIGS. 13 and 14 may be used. According to the shutter 20', the shortwave cutting filter 21 has an aperture 23 on a surface thereon. The aperture 23, which has a pin hole 23a, is operated in association with the opening and closing operation of the shortwave cutting filter 21. When the shortwave cutting filter 21 is moved to such a position as to close shutter 20', the light is blocked except for a portion thereof transmitted through the pin hole 23a. When the shortwave cutting filter 21 is moved to such a position so as to open the shutter 20', the light is allowed to pass. In the former case, the light excluding the shortwave component is emitted in a state which is similar to that of a light emitted from a point light source. Accordingly, substantially parallel light is obtained. As a result, the contrast of the moiré fringes on the screen 19 is enhanced.

Figure 15:
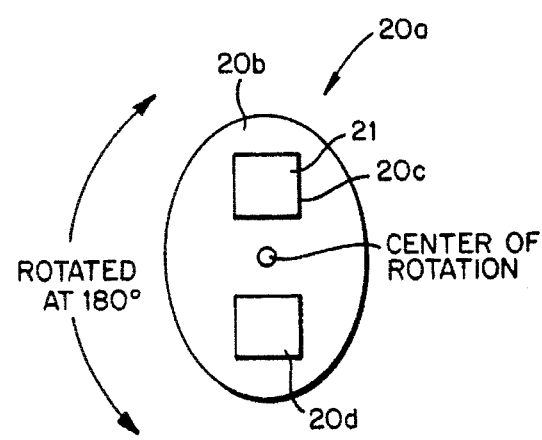
FIG. 15 is a front view of still another shutter.

Further, a shutter 20a shown in FIG. 15 may be employed instead of the optical shutter 20. The shutter 20a includes a plate 20b having windows 20c and 20d. A shortwave cutting filter 21 is fit in the window 20c. In addition to the shortwave cutting filter 21, an aperture having a pin hole may be fit in the window 20c. The plate 20b is controlled to stop after rotating by a motor (not shown) at 180°.

Example 4

Figure 16:
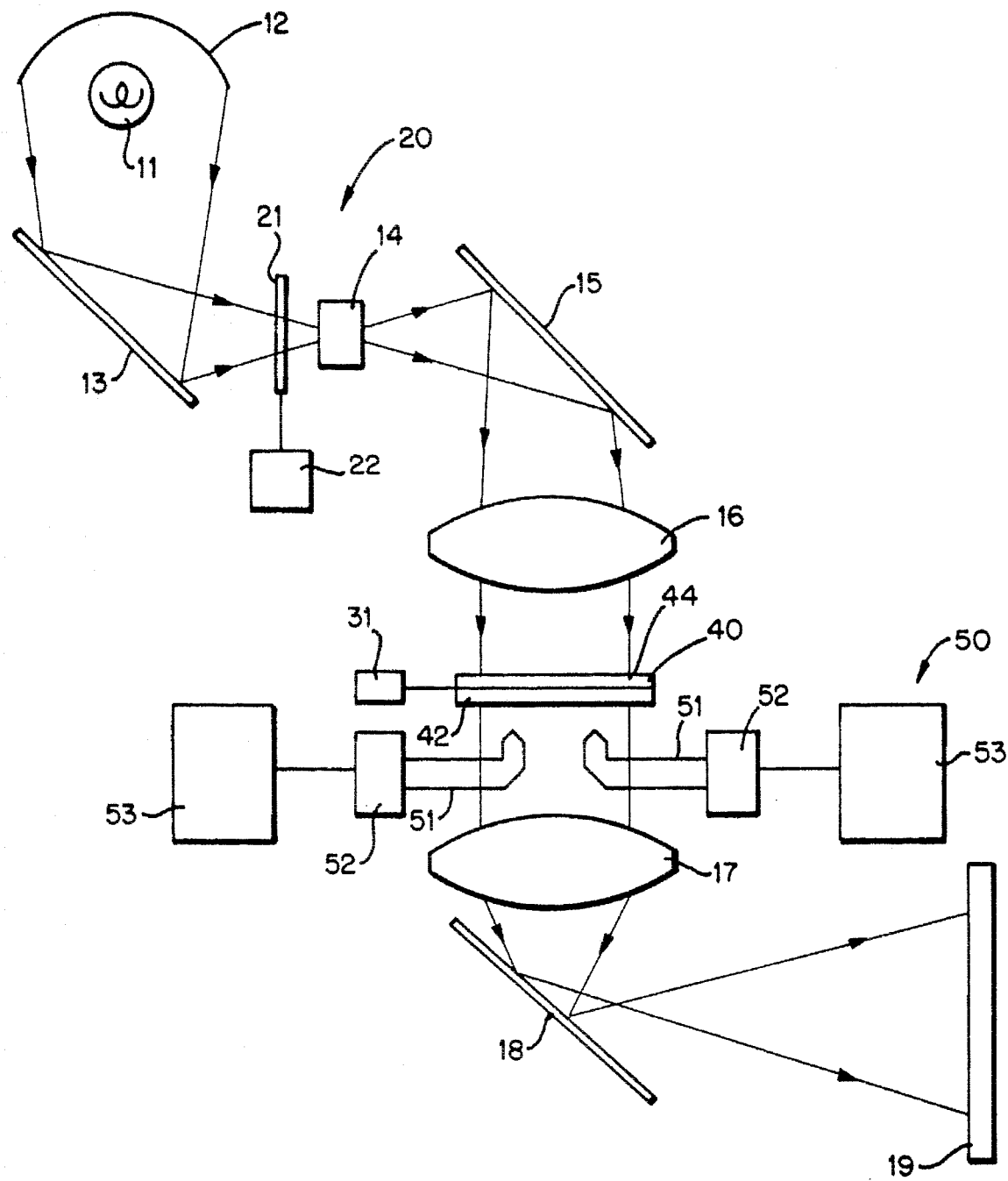
FIG. 16 is a schematic view an optical device assemble apparatus according to a fourth example of the present invention.

FIG. 16 illustrates an optical device assemble apparatus according to a fourth example of the present invention.

Instead of the field lens 66, a collimator lens 16 for running the light in parallel is provided. Except for this point, the fourth example has the identical construction with that of the construction of FIG. 10. The work piece 40 has the identical construction with that of the construction of FIG. 10. The pitch between the microlenses 46 and the pitch between the pixels are matched to each other. The identical members with those of FIG. 10 bear the identical reference numerals.

In FIG. 16, a display plane of the LCD device 42 is projected on the screen 19 in an enlarged state. The positional alignment is conducted by adjusting a brightness of the display plane projected on the screen 19.

The light emitted from the lamp 11 is transmitted through an optical shutter 20. Since the optical shutter 20 blocks the shortwave component for curing the photo-curing adhesive resin 43, the light transmitted through the optical shutter 20 is usable only for positional alignment. The light is run in parallel by a collimator lens 16 and is directed to the work piece 40. The light transmitted through the work piece 40 is projected on the screen 19 through the projecting lens 17 and the reflective mirror 18, thereby projecting the display plane of the LCD device 42 on the screen 19.

The light converged by the projecting lens 17 is reflected by the reflective mirror 18 and is projected on the screen 19 in an enlarged state. Since the projected display plane corresponds to the display plane on the LCD device 42, the positional relationship between the LCD device 42 and the microlens array 44 can be checked visually based on the brightness of the display plane. In the case when the light converged by the microlens 46 is transmitted through the center of the opening 47 (FIG. 17), the display plane on the screen 19 has a highest possible brightness. In this state, the LCD device 42 and the microlens array 44 are positionally aligned. The positional alignment is practically done by operating the aligning mechanism 31 to move the LCD device 42 or the microlens array 44 by a microscopic distance in such a direction as to obtain the brightest possible display plane on the screen 19.

Figure 17:
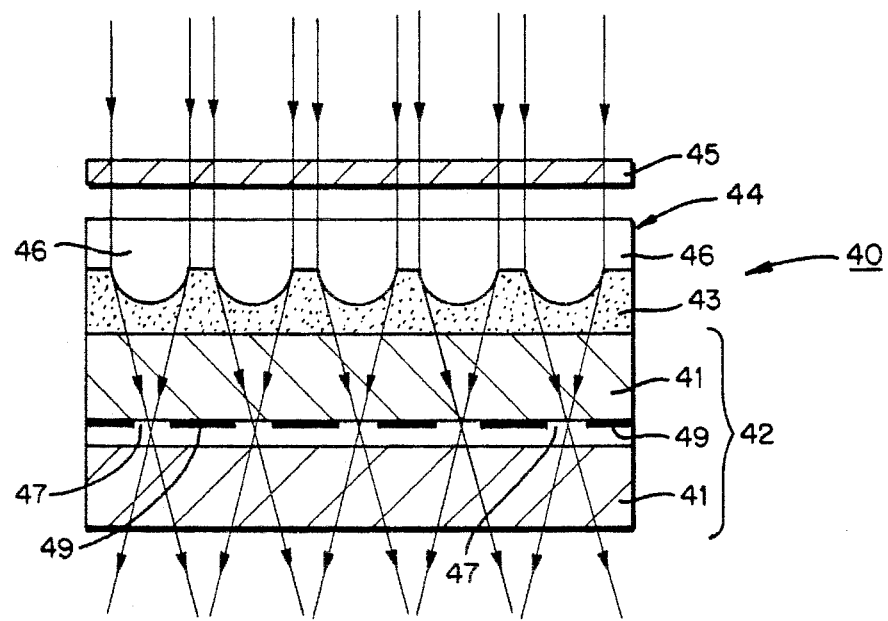
FIG. 17 is a view illustrating the work piece equipped with a filter.

Since the ultraviolet ray-curing adhesive agent is employed as the photo-curing adhesive resin 43 in the fourth example, the filter 25 is employed as is shown in FIG. 17 for blocking an ultraviolet ray having a wavelength of 400 nm or shorter, to which the ultraviolet ray-curing adhesive agent is sensitive. Owing to the filter 45, the photo-curing adhesive resin 43 is more reliably prevented from curing.

After the positional alignment is completed, the filter 45 is removed. The shutter 20 is opened to allow the light including the shortwave and longwave components to pass and is directed to the work piece 40. Thus, the light including the shortwave component is radiated to the photo-curing adhesive resin 43, thereby adhering the LCD device 42 and the microlens array 44. As the photo-curing adhesive resin 43, the ultraviolet ray-curing adhesive agent, practically, NOA-61 produced by Norland Corporation is used.

Figure 18:
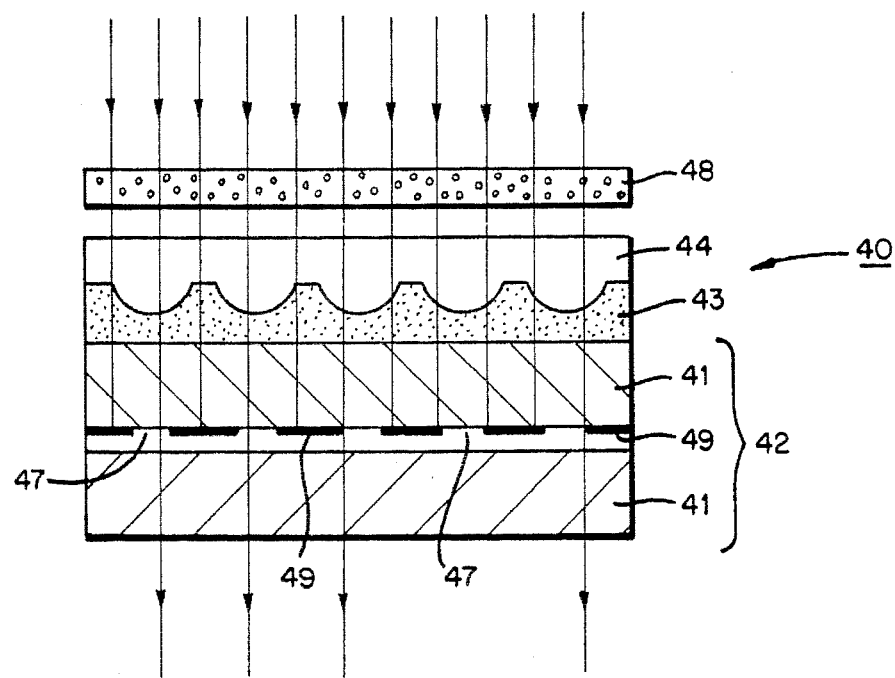
FIG. 18 is a view illustrating the work piece equipped with a diffusing plate.

In order to prevent the parallel light used to cure the photo-curing adhesive resin 43 from converging in the openings 47 (FIG. 17), a diffusing plate 48 is provided (FIG. 18).

According to the fourth example, positional alignment and adhesion can be conducted by one light source. Therefore, the optical device assemble apparatus can be more compact and can be produced at a lower cost. Further, since the display plane of the LCD device 42 is projected on the screen 19 in an enlarged state, scratches on the microlens 46 or bubbles in the photo-curing adhesive resin 43 can be detected at the stage of positional alignment. Therefore, the defection ratio is lowered and the yield ratio of the products is enhanced.

Instead of projecting the display plane of the LCD device 42 on the screen 19, the positional alignment may be conducted by the use of the alignment detecting device 50. In such case, the converging spot of the microlens 46 is monitored.

After the positional relationship between the LCD device 42 and the microlens array 44 are visually checked utilizing the images formed on the monitoring TVs 53, the positional alignment is done by operating the aligning mechanism 31 until the light transmitted through each microlens 46 is converged at the center of the opening 47.

It is necessary to avoid the relative rotation of the microlens array 44 and the LCD device 42 at an angle of θ° on a plane which is perpendicular to the optical axis of the objective lens 51. For this purpose, the objective lenses 51 and the CCD cameras 52 may be provided in a plurality, or an objective lens 53 and a CCD camera 52 may be moved integratedly along the X and the Y axes to monitor four corners of the work piece 40.

The positional alignment by the use of the alignment detecting device 50 has the same effects as the positional alignment by the use of the screen 19. The use of both of the screen 19 and the alignment detecting device 50 results in more accurate positional alignment.

In the construction in which the light source for the light for positional alignment is disposed on the side of the microlens array 44 and the display plane of the LCD device 42 and the converging spot of the microlens 46 are detected after the light is transmitted through the LCD device 42, light for positional alignment and light for adhesion may be emitted from different light sources. In such a case, the light for positional alignment is emitted from the light source disposed on the side of the microlens array 44, and the light for adhesion is emitted from the light source disposed on the side of the LCD device 42. Only the light for positional alignment is required to transmit through the collimator lens 16 to be run in parallel.

In the case when the pitch between the microlenses 46 and the pixels are not matched, moiré fringes are generated by the parallel light transmitted through the microlenses 46 and the openings 47. In order to prevent such a phenomenon, an appropriate converged light or diverged light is incident on the work piece 40 by moving the collimator lens 16 along the path of the light incident on the collimator lens 16.

In the fourth example, the shutter 20' or the shutter 20a may also be used instead of the shutter 20.

In the first and the second examples, since the positional alignment is conducted by the use of moiré fringes, parallel light is not necessary. Accordingly, the large system for making the light run in parallel used in the fourth example is not necessary, thus realizing a more compact apparatus.

In the case that the monitoring TV 63 is used, the optical device assemble apparatus is more compact than the case using the screen 19.

In Examples 1 through 4, the work piece 40 includes the LCD device 42 and the microlens array 44. The present invention may also be applied to a work piece having a different construction.

In the case that the ultraviolet-ray curing adhesive agent is employed as the photo-curing adhesive resin 43, the filter 45 is desirably employed for blocking an ultraviolet ray having a wavelength of 400 nm or shorter, to which the ultraviolet ray-curing adhesive agent is sensitive. The more shorter the wavelength of the light is, the more harmful the light is to characteristics of the LCD device 42 and the like. Therefore, it is desirable to block, to a highest possible degree, the component which is shorter than is necessary for curing the adhesive agent. As the ultraviolet ray-curing adhesive agent, for example, NOA-61, 63 and 65 produced by Norland Corporation, 363 and 349 produced by Locktita Corporation and AVR-100 produced by Threebond Corporation are used.

As the photo-curing adhesive resin 43, an adhesive agent formed of a visible light-curing resin may be employed. In such a case, a filter for cutting a light having such a wavelength as to cure the visible light-curing resin is used. For example, in the case that LCR produced by ICI Japan Corporation is used, a filter for cutting a light having a wavelength of 520 nm or shorter is used.

As the lamp 11, a mercury lamp, a mercury xenon lamp, a metal halide lamp or a xenon lamp may be used. In the case that the visible light-curing adhesive agent is used, the xenon lamp is desirable. Light for positional alignment and light for adhesion may be emitted from different light sources and combined by a dichroic mirror.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. An optical apparatus for adhering an optical device including a microlens array and a matrix liquid crystal display, wherein the microlens array has a focal length and the array is separated by the focal length from the matrix liquid crystal display, and; the optical apparatus comprising:

light source means for emitting light for positional alignment and light for adhesion toward the optical device;

position detecting means for receiving the light for positional alignment from the optical device, said position detecting means monitoring moiré fringes formed by the light for positional alignment transmitted through or reflected by the matrix liquid crystal display and passing through the microlens array, and optically detecting a positional displacement of the of the microlens array with respect to the matrix liquid crystal display; and a positional alignment mechanism means for supporting the optical device and moving the micro lens array and matrix liquid crystal display to be movable with respect to each other and positionally aligning the micro lens array and the matrix liquid crystal display in accordance with a detecting result of the position detecting means;

wherein the light for adhesion is radiated to a photo-curing adhesive resin interposed between the the positionally aligned microlens array and matrix liquid crystal display.

2. An optical apparatus according to claim 1, wherein the light source means comprises a first light source for emitting the light for positional alignment and a second light source for emitting the light for adhesion, the light emitted by the first light source is directed to be incident on the optical device from the side of the microlens array, and the position detecting means receives a portion of the light for positional alignment emitted by the first light source, the portion having been transmitted through the optical device.

3. An optical apparatus according to claim 1, wherein the light source means includes a first light source for emitting the light for positional alignment and a second light source for emitting the light for adhesion, the light emitted by the first light source is directed to be incident on the optical device from the side of the microlens array, and the position detecting means receives a portion of the light for positional alignment emitted by the first light source, the portion having been reflected by the optical device.

4. An optical apparatus according to claim 1, the light source means includes a first light source for emitting the light for positional alignment and a second light source for emitting the light for adhesion, the light emitted by the first light source is directed to be incident on the optical device from the side of the matrix liquid crystal display device, and the position detecting means receives a portion of the light for positional alignment emitted by the first light source, the portion having been transmitted through the optical device.

5. An optical apparatus according to claim 4, wherein the position detecting means monitors moiré fringes formed by the light for positional alignment transmitted through an opening of the matrix liquid crystal display device and microlenses of the microlens array.

6. An optical apparatus according to claim 1, wherein one of the set of optical devices is disposed on the other with the photo-curing adhesive resin interposed therebetween to be positionally aligned.

7. An optical device apparatus for adhering a set of optical devices after the optical devices are positionally aligned, the optical apparatus comprising:

light source means for emitting light for positional alignment and light for adhesion toward the optical devices;

position detecting means for receiving the light for positional alignment from the optical devices, said position detecting means monitoring moiré fringes formed by the light for positional alignment transmitted through or reflected by a first of the optical devices and transmitted through a second of the optical devices, and optically detecting a positional displacement of the optical devices, the second of the optical devices having a focal length and the first of the optical devices being separated by the focal length from the second of the optical devices; and a positional alignment mechanism means for supporting the optical devices to be movable with respect to each other and positionally aligning the optical devices in accordance with a detecting result of the position detecting means;

wherein the light for adhesion is radiated to a photo-curing adhesive resin interposed between the optical devices which are positionally aligned to adhere the optical devices, and wherein the set of optical devices includes a microlens array and a matrix liquid crystal display device, the light source means comprises a light source for emitting both the light for positional alignment and the light for adhesion and a shutter for cutting off the light for adhesion at a closed state, the light for positional alignment is directed to be incident on the optical devices from the side of the microlens array through the shutter, and the position detecting means receives a portion of the light for positional alignment emitted by the light source, the portion having been transmitted through the optical devices.

8. An optical apparatus according to claim 7, wherein the light for positional alignment is a parallel light, and the position detecting means comprises projecting means for projecting a display plane of the matrix liquid crystal display device in an enlarged state.

9. An optical apparatus according to claim 7, wherein the light for positional alignment is a parallel light, and the position detecting means comprises monitoring means for monitoring a converging spot of microlenses of the microlens array in an enlarged state.

10. An optical apparatus according to claim 3, wherein the light for adhesion is emitted toward to the optical devices when the shutter is open.

11. An optical device apparatus for adhering a set of optical devices after the optical devices are positionally aligned, the optical apparatus comprising:

light source means for emitting light for positional alignment and light for adhesion toward the optical devices;

position detecting means for receiving the light for positional alignment from the optical devices, said position detecting means monitoring moiré fringes formed by the light for positional alignment transmitted through or reflected by a first of the optical devices and transmitted through a second of the optical devices, and optically detecting a positional displacement of the optical devices, the second of the optical devices having a focal length and the first of the optical devices being separated by the focal length from the second of the optical devices, and a positional alignment mechanism means for supporting the optical devices to be movable with respect to each other and positionally aligning the optical devices in accordance with a detecting result of the position detecting means;

wherein the light for adhesion is radiated to a photo-curing adhesive resin interposed between the optical devices which are positionally aligned to adhere the optical devices, and wherein the set of optical devices includes a microlens array and a matrix liquid crystal display device, the light source means includes a light source for emitting both the light for positional alignment and the light for adhesion and a shutter for cutting off the light for adhesion at a closed state, the light for positional alignment is directed to be incident 12. An optical apparatus according to claim 11, wherein the position detecting means monitors moiré fringes formed by the light for positional alignment reflected by a black matrix of the matrix liquid crystal display device and transmitted through microlenses of the microlens array.

13. An optical device apparatus for adhering a set of optical devices after the optical devices are positionally aligned, the optical apparatus comprising:

light source means for emitting light for positional alignment and light for adhesion toward the optical devices;

position detecting means for receiving the light for positional alignment from the optical devices, said position detecting means monitoring moiré fringes formed by the light for positional alignment transmitted through or reflected by a first of the optical devices and transmitted through a second of the optical devices, and optically detecting a positional displacement of the optical devices, the second of the optical devices having a focal length and the first of the optical devices being separated by the focal length from the second of the optical devices; and a positional alignment mechanism means for supporting the optical devices to be movable with respect to each other and positionally aligning the optical devices in accordance with a detecting result of the position detecting means;

wherein the light for adhesion is radiated to a photo-curing adhesive resin interposed between the optical devices which are positionally aligned to adhere the optical devices, and wherein the set of optical devices includes a microlens array and a matrix liquid crystal display device, the light source means includes a light source for emitting both the light for positional alignment and the light for adhesion and a shutter for cutting off the light for adhesion when at a closed state, the light for positional alignment is directed to be incident on the optical devices from the side of the matrix liquid crystal display device, and the position detecting means receives a portion of the light for positional alignment emitted by the light source, the portion having been transmitted through the optical devices.

14. An optical device apparatus for adhering a set of optical devices after the optical devices are positionally aligned, the optical apparatus comprising:

light source means for emitting light for positional alignment and light for adhesion toward the optical devices;

position detecting means for receiving the light for positional alignment from the optical devices, said position detecting means monitoring moiré fringes formed by the light for positional alignment transmitted through or reflected by a first of the optical devices and transmitted through a second of the optical devices, and optically detecting a positional displacement of the optical devices, the second of the optical devices having a focal length and the first of the optical devices being separated by the focal length from the second of the optical devices; and a positional alignment mechanism means for supporting the optical devices to be movable with respect to each other and positionally aligning the optical devices in accordance with a detecting result of the position detecting means;

wherein the light for adhesion is radiated to a photocuring adhesive resin interposed between the optical devices which are positionally aligned to adhere the optical devices, and wherein the position detecting means comprises switching means for switching conditions of the light for positional alignment incident on the optical devices and adjusts a state of the moiré fringes in accordance with the conditions of the light.

15. An optical apparatus according to claim 14, wherein the switching means comprises a lens movable on a path of the light for positional alignment along the path of the light.

16. An optical apparatus according to claim 14, wherein the switching means comprises a lens movable between a position on a path of the light for positional alignment and a position off the path.

17. An optical apparatus according to claim 14, wherein the switching means comprises a diffusing plate movable on a path of the light for positional alignment along the path of the light.

18. An optical apparatus according to claim 17, wherein the diffusing plate comprises a microlens array.

19. An optical apparatus according to claim 14, wherein the switching means comprises a diffusing plate movable between a position on a path of the light for positional alignment and a position off the path.

20. An optical apparatus for adhering a set of optical devices after the optical devices are positionally aligned, the optical apparatus comprising:

light source means for emitting light for positional alignment and light for adhesion toward the optical devices;

position detecting means for receiving the light for positional alignment from the optical devices, said position detecting means monitoring moiré fringes formed by the light for positional alignment transmitted through or reflected by a first of the optical devices and transmitted through a second of the optical devices, and optically detecting a positional displacement of the optical devices, the second of the optical devices having a focal length and the first of the optical devices being separated by the focal length from the second of the optical devices; and a positional alignment mechanism means for supporting the optical devices to be movable with respect to each other and positionally aligning the optical devices in accordance with a detecting result of the position detecting means;

wherein the light for adhesion is radiated to a photocuring adhesive resin interposed between the optical devices which are positionally aligned to adhere the optical devices;

wherein the set of optical devices includes a microlens array and a matrix liquid crystal display device, the light source means comprises a light source for emitting both the light for positional alignment and the light for adhesion and a shutter for cutting off the light for adhesion at a closed state, the light for positional alignment is directed to be incident on the optical devices from the side of the microlens array through the shutter, and the position detecting means receives a portion of the light for positional alignment emitted by the light source, the portion having been transmitted through the optical devices, and wherein the light source means further comprises aperture means for, in a closed state, allowing the light for positional alignment emitted by the light source means to be in a state of light emitted by a point light source, said aperture means being operated in association with a state of the shutter.

21. An optical apparatus for adhering a set of optical devices after the optical devices are positionally aligned, the optical apparatus comprising:

light source means for emitting light for positional alignment and light for adhesion toward the optical devices;

position detecting means for receiving the light for positional alignment from the optical devices, said position detecting means monitoring moiré fringes formed by the light for positional alignment transmitted through or reflected by a first of the optical devices and transmitted through a second of the optical devices, and optically detecting a positional displacement of the optical devices, the second of the optical devices having a focal length and the first of the optical devices being separated by the focal length from the second of the optical devices; and a positional alignment mechanism means for supporting the optical devices to be movable with respect to each other and positionally aligning the optical devices in accordance with a detecting result of the position detecting means;

wherein the light for adhesion is radiated to a photocuring adhesive resin interposed between the optical devices which are positionally aligned to adhere the optical devices, and the position detecting means comprises switching means for switching a condition of the light for positional alignment incident on the optical devices to form the moiré fringes according to an optical condition determined by the structure of the first and second of the optical devices.

* * * * *